(12) United States Patent
Fuhr et al.

(10) Patent No.: US 8,535,825 B2
(45) Date of Patent: Sep. 17, 2013

(54) MANDREL WITH DRIVE MEMBER FOR ELECTROCHEMICAL CELLS

(75) Inventors: Jason Fuhr, Sussex, WI (US); Chris Bonin, South Milwaukee, WI (US)

(73) Assignee: Johnson Controls—SAFT Advanced Power Solutions LLC., Wilmington, DE (US)

(*) Notice: Subject to any disclaimer, the term of this patent is extended or adjusted under 35 U.S.C. 154(b) by 143 days.

(21) Appl. No.: 12/957,052

(22) Filed: Nov. 30, 2010

(65) Prior Publication Data

US 2011/0129712 A1 Jun. 2, 2011

Related U.S. Application Data

(63) Continuation of application No. PCT/US2009/053577, filed on Aug. 12, 2009.

(60) Provisional application No. 61/088,622, filed on Aug. 13, 2008.

(51) Int. Cl.
*H01M 2/18* (2006.01)
*H01M 6/08* (2006.01)

(52) U.S. Cl.
USPC ............................................. 429/133; 429/164

(58) Field of Classification Search
None
See application file for complete search history.

(56) References Cited

U.S. PATENT DOCUMENTS 4,759,284 A * 7/1988 Haggard et al. ............... 101/148

FOREIGN PATENT DOCUMENTS

| JP | 09-092339 A | 4/1997 |
| JP | 11-054153 A | 2/1999 |
| KR | 10-2007-0047961 A | 5/2007 |

OTHER PUBLICATIONS

International Search Report and Written Opinion for International Application No. PCT/US2009/053577, date of completion Apr. 30, 2010, 8 pages.

* cited by examiner

*Primary Examiner* — Cynthia Walls
(74) *Attorney, Agent, or Firm* — Foley & Lardner LLP

(57) ABSTRACT

A mandrel for an electrochemical cell includes an elongated hollow tube. At least one drive member is provided at an end of the hollow tube and is configured to receive a driver in order to rotate the mandrel. The drive member is configured to electrically insulate the hollow tube from an electrode that is wound around the hollow tube.

13 Claims, 6 Drawing Sheets

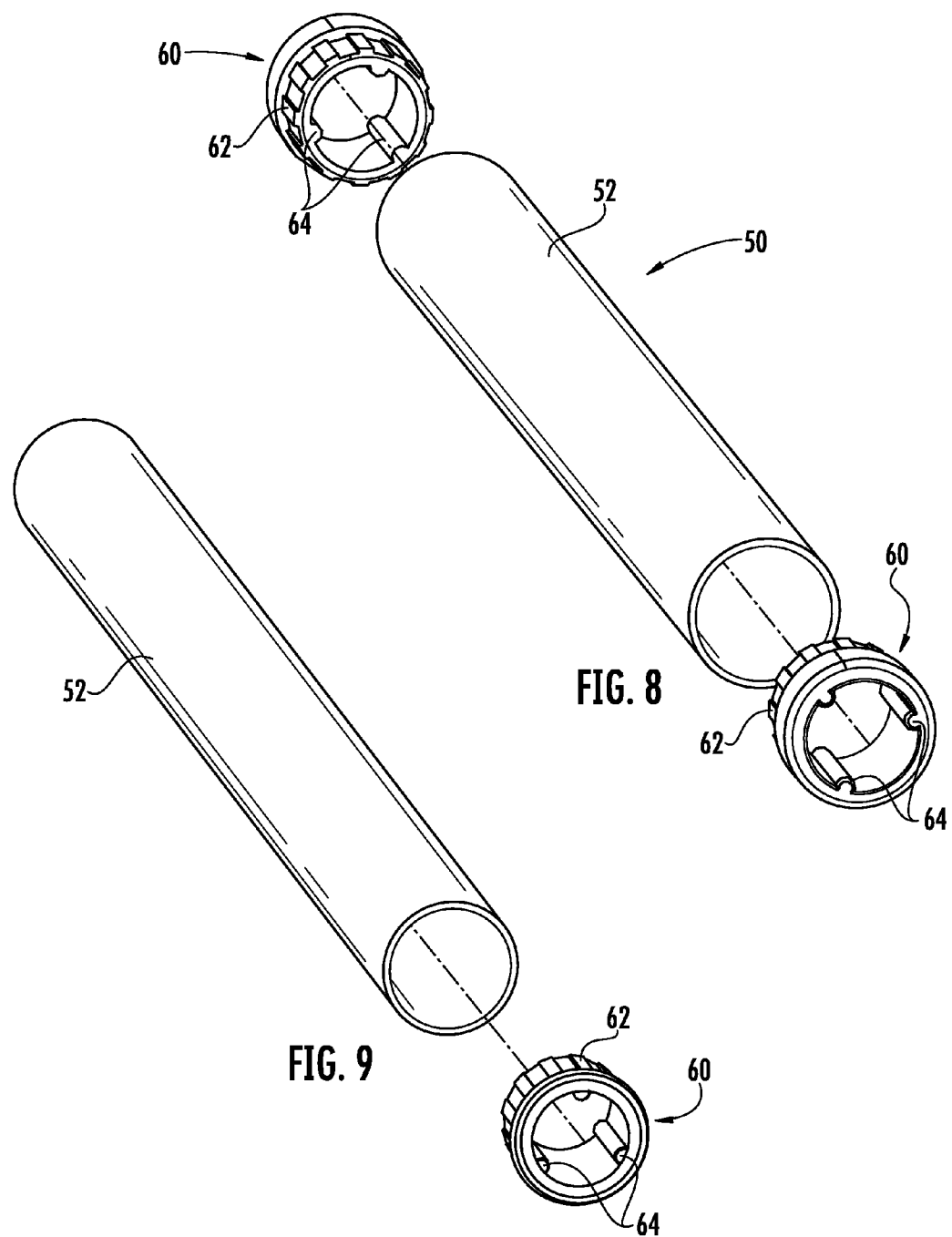

MANDREL WITH DRIVE MEMBER FOR ELECTROCHEMICAL CELLS

CROSS-REFERENCE TO RELATED PATENT APPLICATIONS

This application is a Continuation of International Application No. PCT/US2009/053577 filed Aug. 12, 2009, which claims the benefit of and priority to U.S. Provisional Patent Application No. 61/088,622, filed Aug. 13, 2008. The entire disclosures of International Application No. PCT/US2009/053577 and U.S. Provisional Patent Application No. 61/088,622 are incorporated herein by reference.

BACKGROUND

The present application relates generally to the field of batteries and battery systems. More specifically, the present application relates to batteries and battery systems that may be used in vehicle applications to provide at least a portion of the motive power for the vehicle.

Vehicles using electric power for all or a portion of their motive power (e.g., electric vehicles (EVs), hybrid electric vehicles (HEVs), plug-in hybrid electric vehicles (PHEVs), and the like, collectively referred to as "electric vehicles") may provide a number of advantages as compared to more traditional gas-powered vehicles using internal combustion engines. For example, electric vehicles may produce fewer undesirable emission products and may exhibit greater fuel efficiency as compared to vehicles using internal combustion engines (and, in some cases, such vehicles may eliminate the use of gasoline entirely, as is the case with certain types of PHEVs).

As electric vehicle technology continues to evolve, there is a need to provide improved power sources (e.g., battery systems or modules) for such vehicles. For example, it is desirable to increase the distance that such vehicles may travel without the need to recharge the batteries. It is also desirable to improve the performance of such batteries and to reduce the cost associated with the battery systems.

One area of improvement that continues to develop is in the area of battery chemistry. Early electric vehicle systems employed nickel-metal-hydride (NiMH) batteries as a propulsion source. Over time, different additives and modifications have improved the performance, reliability, and utility of NiMH batteries.

More recently, manufacturers have begun to develop lithium-ion batteries that may be used in electric vehicles. There are several advantages associated with using lithium-ion batteries for vehicle applications. For example, lithium-ion batteries have a higher charge density and specific power than NiMH batteries. Stated another way, lithium-ion batteries may be smaller than NiMH batteries while storing the same amount of charge, which may allow for weight and space savings in the electric vehicle (or, alternatively, this feature may allow manufacturers to provide a greater amount of power for the vehicle without increasing the weight of the vehicle or the space taken up by the battery system).

It is generally known that lithium-ion batteries perform differently than NiMH batteries and may present design and engineering challenges that differ from those presented with NiMH battery technology. For example, lithium-ion batteries may be more susceptible to variations in battery temperature than comparable NiMH batteries, and thus systems may be used to regulate the temperatures of the lithium-ion batteries during vehicle operation. The manufacture of lithium-ion batteries also presents challenges unique to this battery chemistry, and new methods and systems are being developed to address such challenges.

It would be desirable to provide an improved battery module and/or system for use in electric vehicles that addresses one or more challenges associated with NiMH and/or lithium-ion battery systems used in such vehicles. It would also be desirable to provide a battery module and/or system that includes any one or more of the advantageous features that will be apparent from a review of the present disclosure.

SUMMARY

According to an exemplary embodiment, a mandrel for an electrochemical cell includes an elongated hollow tube. At least one drive member is provided at an end of the hollow tube and is configured to receive a driver in order to rotate the mandrel. The drive member is configured to electrically insulate the hollow tube from an electrode that is wound around the hollow tube.

According to another exemplary embodiment, an electrochemical cell includes at least one electrode wound around an elongated member. An edge of the at least one electrode extends beyond a first end of the elongated member. At least one element is coupled to the first end of the elongated member and is configured to insulate the at least one electrode from the elongated member. The element includes a feature for engagement with a device configured to rotate the elongated member.

According to another exemplary embodiment, a method of manufacturing an electrochemical cell includes fixedly coupling at least one drive element to a first end of a tube to form a mandrel, rotating the mandrel such that at least one electrode and at least one separator are wound around the tube to form a cell element, and inserting the mandrel, the at least one electrode, and the at least one separator into a cell housing.

BRIEF DESCRIPTION OF THE DRAWINGS

FIG. 8 is an exploded view of a mandrel comprising two drive members and a hollow tube according to an exemplary embodiment.

FIG. 9 is an exploded view of a mandrel comprising one drive member and a hollow tube according to another exemplary embodiment.

DETAILED DESCRIPTION

Figure 1:
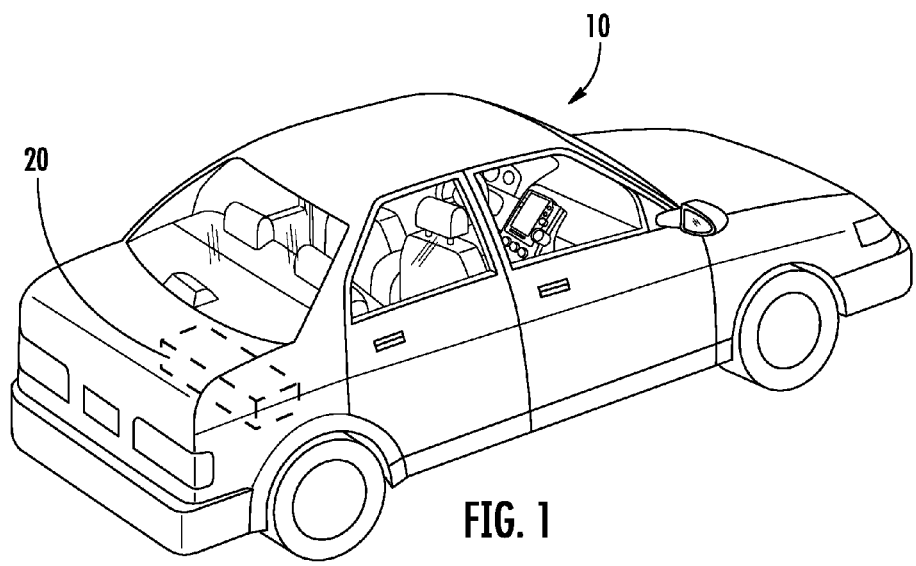
FIG. 1 is a perspective view of a vehicle including a battery module according to an exemplary embodiment.

FIG. 1 is a perspective view of a vehicle 10 in the form of an automobile (e.g., a car) having a battery system 20 for providing all or a portion of the motive power for the vehicle 10. Such a vehicle 10 can be an electric vehicle (EV), a hybrid electric vehicle (HEV), a plug-in hybrid electric vehicle (PHEV), or other type of vehicle using electric power for propulsion (collectively referred to as "electric vehicles").

Although the vehicle 10 is illustrated as a car in FIG. 1, the type of vehicle may differ according to other exemplary embodiments, all of which are intended to fall within the scope of the present disclosure. For example, the vehicle 10 may be a truck, bus, industrial vehicle, motorcycle, recreational vehicle, boat, or any other type of vehicle that may benefit from the use of electric power for all or a portion of its propulsion power.

Although the battery system 20 is illustrated in FIG. 1 as being positioned in the trunk or rear of the vehicle, according to other exemplary embodiments, the location of the battery system 20 may differ. For example, the position of the battery system 20 may be selected based on the available space within a vehicle, the desired weight balance of the vehicle, the location of other components used with the battery system 20 (e.g., battery management systems, vents or cooling devices, etc.), and a variety of other considerations.

Figure 2:
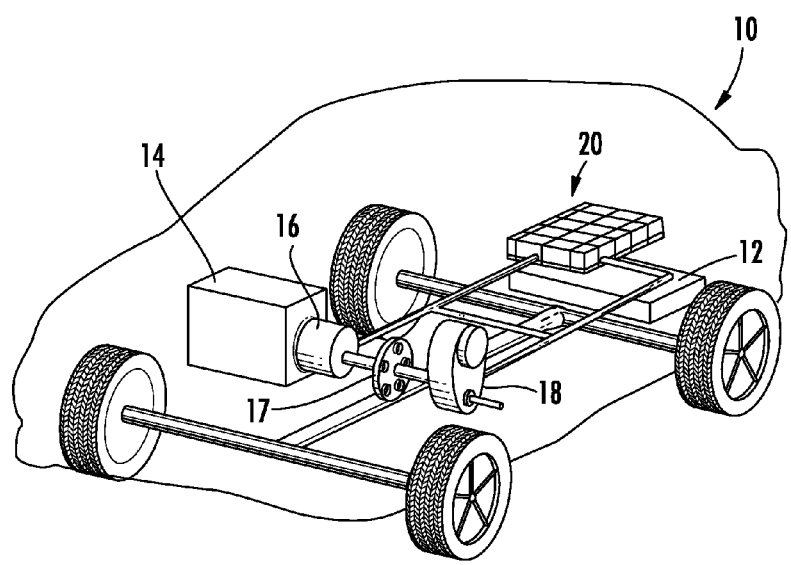
FIG. 2 is a cutaway schematic view of a vehicle including a battery module according to an exemplary embodiment.

FIG. 2 illustrates a cutaway schematic view of a vehicle 10 provided in the form of an HEV according to an exemplary embodiment. A battery system 20 is provided toward the rear of the vehicle 10 proximate a fuel tank 12 (the battery system 20 may be provided immediately adjacent the fuel tank 12 or may be provided in a separate compartment in the rear of the vehicle 10 (e.g., a trunk) or may be provided elsewhere in the vehicle 10). An internal combustion engine 14 is provided for times when the vehicle 10 utilizes gasoline power to propel the vehicle 10. An electric motor 16, a power split device 17, and a generator 18 are also provided as part of the vehicle drive system.

Such a vehicle 10 may be powered or driven by just the battery system 20, by just the engine 14, or by both the battery system 20 and the engine 14. It should be noted that other types of vehicles and configurations for the vehicle drive system may be used according to other exemplary embodiments, and that the schematic illustration of FIG. 2 should not be considered to limit the scope of the subject matter described in the present application.

According to various exemplary embodiments, the size, shape, and location of the battery system 20, the type of vehicle 10, the type of vehicle technology (e.g., EV, HEV, PHEV, etc.), and the battery chemistry, among other features, may differ from those shown or described.

According to an exemplary embodiment, the battery system 20 is responsible for packaging or containing electrochemical batteries or cells 24, connecting the electrochemical cells 24 to each other and/or to other components of the vehicle electrical system, and regulating the electrochemical cells 24 and other features of the battery system 20. For example, the battery system 20 may include features that are responsible for monitoring and controlling the electrical performance of the battery system 20, managing the thermal behavior of the battery system 20, containment and/or routing of effluent (e.g., gases that may be vented from a cell 24), and other aspects of the battery system 20.

Figure 3:
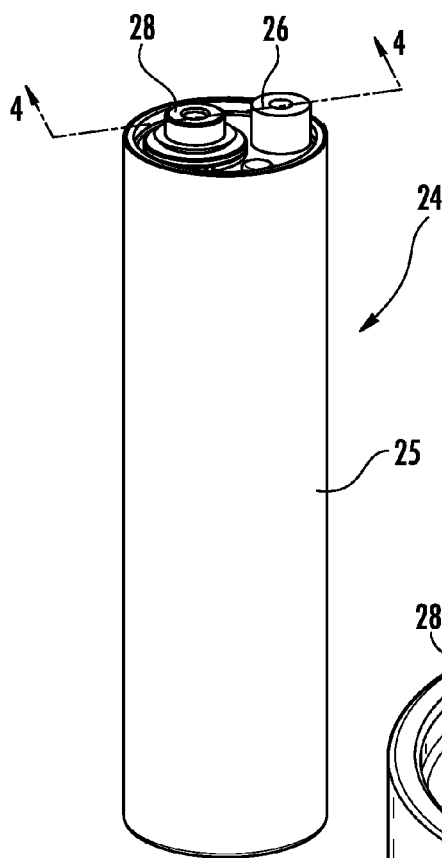
FIG. 3 is an isometric view of an electrochemical cell according to an exemplary embodiment.

Referring now to FIG. 3, an isometric view of an electrochemical cell is shown according to an exemplary embodiment. The battery system 20 includes a plurality of such electrochemical batteries or cells 24 (e.g., lithium-ion cells, nickel-metal-hydride cells, lithium polymer cells, etc., or other types of electrochemical cells now known or hereafter developed). According to an exemplary embodiment, the electrochemical cells 24 are generally cylindrical lithium-ion cells configured to store an electrical charge. According to other exemplary embodiments, the cells 24 could have other physical configurations (e.g., oval, prismatic, polygonal, etc.). The capacity, size, design, terminal configuration, and other features of the cells 24 may also differ from those shown according to other exemplary embodiments.

Figure 4:
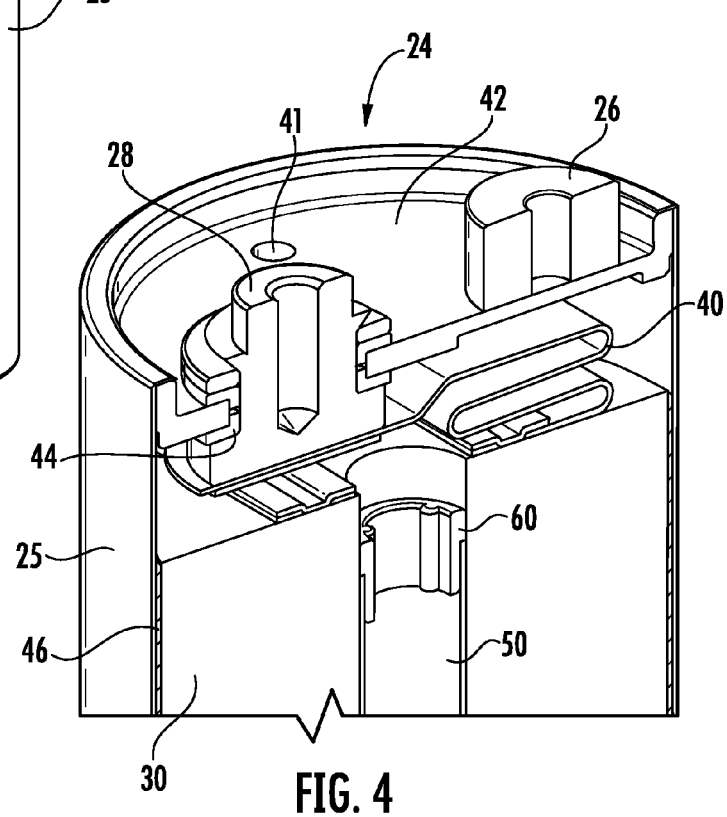
FIG. 4 is a partial cross-section view of the electrochemical cell shown in FIG. 3 taken along line 4-4 in FIG. 3.

FIG. 4 is a partial cross-section view of a cell 24 such as that shown in FIG. 3 taken along line 4-4 in FIG. 3. According to an exemplary embodiment, the cell 24 includes a container or housing 25, a cap or cover 42, a cell element 30. According to an exemplary embodiment, the cell element 30 is a wound cell element that includes at least one cathode or positive electrode 36, at least one anode or negative electrode 38, and one or more separators 32, 34. The separators 32, 34 are provided intermediate or between the positive and negative electrodes 36, 38 to electrically isolate the electrodes 36, 38 from each other. According to an exemplary embodiment, the cell 24 includes an electrolyte (not shown). According to an exemplary embodiment, the electrolyte is provided in the housing 25 of the cell 24 through a fill hole 41.

According to an exemplary embodiment, the cell element 30 has a wound configuration in which the electrodes 36, 38 and separators 32, 34 are wound around a member or element provided in the form of a tube or mandrel 50. Such a configuration may be referred to alternatively as a jelly roll configuration. Although the mandrel 50 is shown as being provided as having a generally cylindrical shape, according to other exemplary embodiments, the mandrel 50 may have a different configuration (e.g., it may have an oval or rectangular cross-section shape, etc.). It is noted that the cell element 30, although shown as having a generally cylindrical shape, may also have a different configuration (e.g., it may have an oval, rectangular, or other desired cross-section shape).

Figure 5:
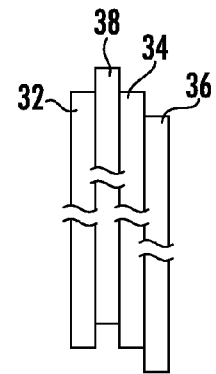
FIG. 5 is a partial cross-section view of the electrodes and separators according to an exemplary embodiment.

According to an exemplary embodiment, the positive electrode 36 is offset from the negative electrode 38 in the axial direction as shown in the partial cross-section view shown in FIG. 5. Accordingly, at a first end of the cell element 30, the wound positive electrode 36 will extend further than the negative electrode 38, and at a second (opposite) end of the cell element 30, the negative electrode 38 will extend further than the positive electrode 36. One advantageous feature of such a configuration is that current collectors may be connected to a specific electrode at one end of the cell 24 without contacting the opposite polarity electrode. For example, according to an exemplary embodiment, a negative current collector 40 (e.g., as shown in FIG. 4) may be connected to the exposed negative electrode 38 at one end of the cell element 30 and a positive current collector (not shown) may be connected to the exposed positive electrode 36 at the opposite end of the cell element 30.

According to an exemplary embodiment, the negative current collector 40 electrically connects the negative electrode 38 to the negative terminal 28 of the cell 24. The negative terminal 28 is insulated from the cover 42 of the housing 25 by an insulator 44, as shown in FIG. 4. According to an exemplary embodiment, the positive current collector (not shown) electrically connects the positive electrode 36 to a bottom of the housing 25. The housing 25 is electrically connected to the cover 42 (e.g., as shown in FIG. 4), which in turn is electrically connected to the positive terminal 26.

Figure 6:
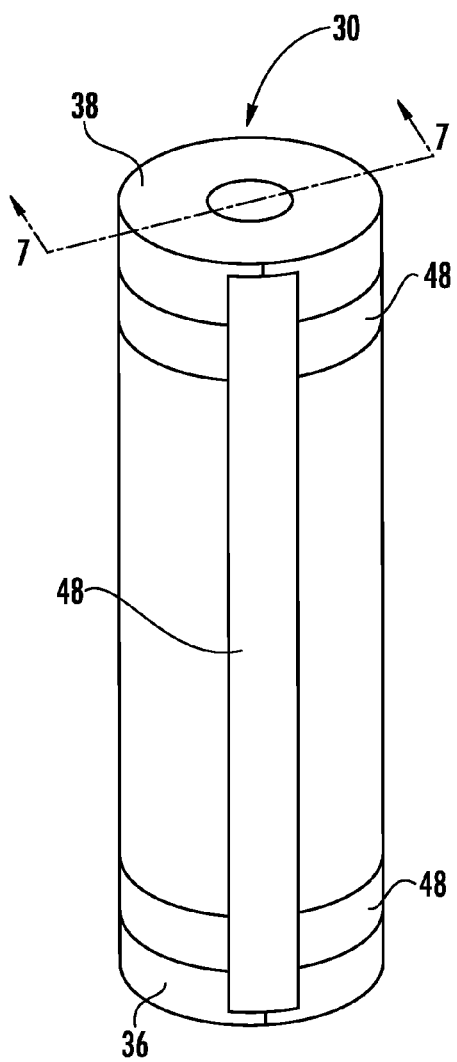
FIG. 6 is an isometric view of a cell element provided in the form of a jelly roll configuration according to an exemplary embodiment.
Figure 7:
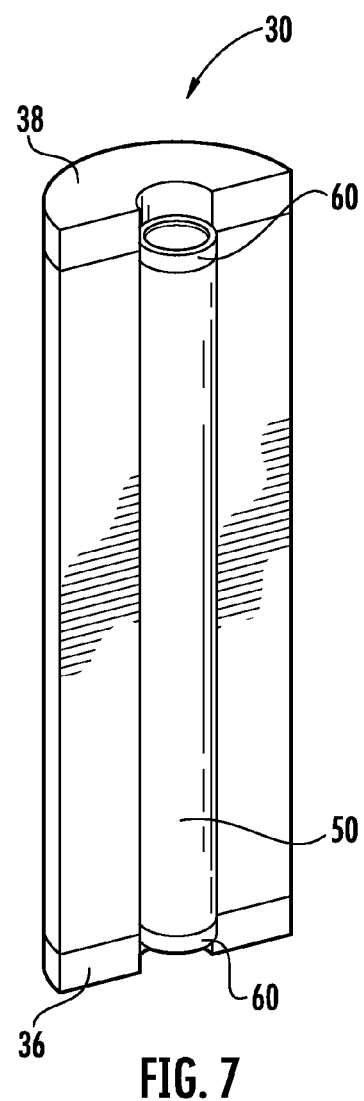
FIG. 7 is a cross-section view of the cell element shown in FIG. 6 taken along line 7-7 in FIG. 6.

FIGS. 6-7 illustrate an exemplary embodiment of a wound cell element 30 (e.g., a jelly roll) in which electrodes 36, 38 and separators 32, 34 (not shown) are wound around a member or element provided in the form of a mandrel 50 (e.g., a body, center member, shaft, rod, tube etc.). According to an exemplary embodiment, an adhesive or tape 48 (e.g., as shown in FIG. 6) may be used to position an insulative wrap 46 (e.g., as shown in FIG. 4) around the cell element 30 in order to at least partially electrically insulate the cell element 30 from the housing 25.

According to an exemplary embodiment, the mandrel 50 is provided in the form of an elongated hollow tube 52 and is configured to allow gases from inside the electrochemical cell to flow from one end of the electrochemical cell (e.g., the top) to the other end of the electrochemical cell (e.g., the bottom). According to another exemplary embodiment, the mandrel 50 may be provided as a solid tube.

The mandrel 50 is illustrated, for example, in FIG. 7 as being provided within the center of the cell element 30. According to an exemplary embodiment, the mandrel 50 does not extend all the way to the very top and bottom of the cell element 30. According to other exemplary embodiments, the mandrel 50 may extend all the way to the top and/or bottom of the cell element 30.

Still referring to FIGS. 6-7, according to an exemplary embodiment, the mandrel 50 includes at least one (i.e., one or more) elements or drive members 60 joined to an end of the hollow tube 52. According to an exemplary embodiment, the drive members 60 are configured to electrically insulate the hollow tube 52 from the electrodes 36, 38. According to another exemplary embodiment, the hollow tube 52 may be provided in electrical contact with one of the electrodes while being electrically insulated from the other electrode. For example, according to an exemplary embodiment, the hollow tube 52 may be electrically coupled to the positive electrode 36 (or negative electrode 38), while the hollow tube 52 is electrically isolated from the negative electrode 38 (or positive electrode 36) by the drive member 60.

According to an exemplary embodiment, the drive members 60 are formed from an insulative material such as a polymeric material or other suitable material (e.g., a plastic resin) and the hollow tube 52 is formed from an electrically (and thermally) conductive material such as a metallic material or other suitable material (e.g., aluminum or aluminum alloy). According to another exemplary embodiment, the drive members 60 are formed from an electrically (and thermally) conductive material such as a metallic material or other suitable material (e.g., aluminum or aluminum alloy) and the hollow tube is formed from an insulative material such as a polymeric material or other suitable material (e.g., a plastic resin). According to another exemplary embodiment, both the drive members 60 and the hollow tube 52 are formed from an insulative material such as a polymeric material or other suitable material (e.g., a plastic resin).

One advantageous feature of the mandrels 50 as described above is that the drive members 60 coupled to the hollow tube 52 keep the positive and negative electrodes 36, 38 electrically separated from each other. Additionally, when the hollow tube 52 of the mandrel 50 is formed from a relatively low cost material (e.g., a drawn aluminum tube or extruded aluminum tube), the mandrel 50 may have a lower cost as compared to other mandrels in which the entire assembly is made of a polymeric material.

FIG. 8 shows an exploded view of a mandrel 50 that is configured to have elements or drive members 60 coupled to both ends of a hollow tube 52 according to an exemplary embodiment. According to an exemplary embodiment, a method of joining the drive member 60 to the hollow tube 52 includes press-fitting at least a portion of the drive member 60 into the hollow tube 52.

According to the exemplary embodiment shown in FIG. 8, the drive member 60 has a plurality of features or projections 62 extending generally radially outward from the drive member 60 at an end of the drive member 60 (e.g., such that the projections 62 may be pressed into engagement with an interior of the hollow tube). These projections 62 are intended to improve the quality of the press fit and the retention of the drive member 60 in the hollow tube 52.

According to other exemplary embodiments, the surface of the drive member 60 joined to the hollow tube 52 may have a geometry that is flat or otherwise shaped to join with the hollow tube 52. Other methods of joining may be used according to other exemplary embodiments. For example, the drive member 60 may be joined to the hollow tube 52 by overmolding, crimping, adhesives, or other suitable methods.

According to an exemplary embodiment, the drive member 60 is provided as a ring or other structure that has an internal surface that is configured for engaging a member or element inserted into the drive member (e.g., a driver (not shown)) that may be used to rotate or drive the drive member 60. According to an exemplary embodiment, the drive member 60 includes at least one internal feature or projection 64 (e.g., ridge, protrusion, boss, etc.) configured for engagement with a driver (not shown).

For example, according to an exemplary embodiment, the driver may be provided in the form of a member having a hexagonal or other cross-section shape that is configured to engage the internal projections of the drive member (e.g., the driver may have a triangular, square, rectangular, hexagonal, star, or other suitable shape). According to other exemplary embodiments, the drive member 60 may include indentations (e.g., cutouts, grooves, etc. (not shown)) or other features in addition to or instead of the internal projections 64, and the driver used to rotate the drive member 60 may have protrusions or other features to engage the indentations. According to another exemplary embodiment, the drive member 60 may be configured to be driven by a driver (not shown) that engages external features (not shown) of the drive member 60.

According to an exemplary embodiment, the mandrel 50 may be driven by a single driver that is received by one of the drive members 60. In this embodiment, the opposite drive member 60 may be engaged/received by a spindle (e.g., dead center, etc.) that freely rotates (i.e., is not driven). One advantage of this configuration is that the mandrel 50 may be inserted into a winding machine (not shown) without regard to orientation of the mandrel 50. In other words, it makes no difference whether the mandrel 50 is inserted into the winding machine in a first orientation or rotated 180 degrees with respect to the first orientation (i.e., end-for-end). According to another exemplary embodiment, the mandrel 50 may be driven or rotated by a driver inserted into both driving members 60.

According to another exemplary embodiment, the mandrel 50 may be driven or rotated by a single driver that is inserted into one end of the mandrel 50 and extends through the hollow tube 52 to engage both drive members 60 in order to rotate the mandrel 50. According to an exemplary embodiment, one or both of the drive members 60 may be removed from the hollow tube 52 after winding of the cell element (i.e., the electrodes and the separators) has been completed (regardless of the method use to drive the mandrel 50).

Referring now to FIG. 9, an exploded view of a mandrel 50 is shown according to another exemplary embodiment in which the mandrel 50 is configured to have a drive member 60 attached to only one of the ends of the hollow tube 52. According to an exemplary embodiment, the drive member 60 may have substantially the same configuration as that described with respect to FIG. 8, and may also be joined to the hollow tube 52 in substantially the same way. According to other exemplary embodiments, the drive member 60 may be configured and attached to hollow tube 52 differently than as described above.

According to an exemplary embodiment, the mandrel 50 shown in FIG. 9 may be driven by a driver similar to that as described with respect to FIG. 8. In this embodiment, the driver is received in the end of the mandrel 50 having the drive member 60. The opposite end (i.e., the end of the hollow tube 52 not having the drive member 60) may then be engaged or received by a spindle (e.g., dead center, etc.) that freely rotates (i.e., is not driven).

Figure 10:
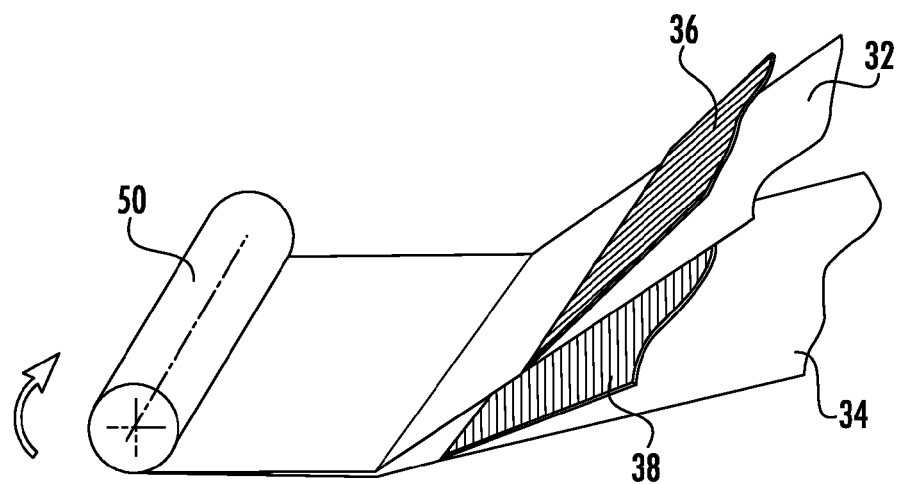
FIG. 10 is an isometric view showing the initial assembly of a cell element according to an exemplary embodiment.
Figure 11:
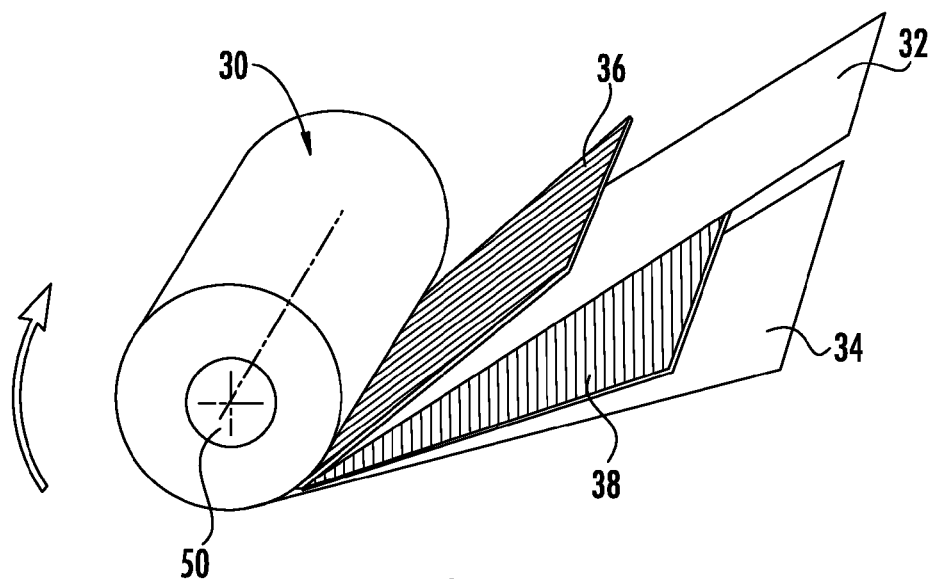
FIG. 11 is an isometric view showing the final assembly of a cell element according to an exemplary embodiment.

Referring now to FIGS. 10-11, the assembly of a cell element 30 is shown according to an exemplary embodiment. Although not shown in detail, the mandrel 50 is represented schematically in FIGS. 10-11. In FIG. 10, separators 32, 34 are attached to the mandrel 50 with double-face or double-sided tape (or with another suitable adhesive or attachment means), after which the separators 32, 34 are wound around the mandrel 50 (e.g., two or more turns of the mandrel 50). According to the exemplary embodiment shown in FIG. 10, two turns of the mandrel 50 uses 72 millimeters of the length of the separators 32, 34, but may use more or less according to other exemplary embodiments. An end of the negative electrode 38 (i.e., a leading edge) is then placed between separators 32, 34, after which an end (i.e., a leading edge) of the positive electrode 36 is placed on top of separator 32 (although the order in which the positive and negative electrodes 36, 38 are inserted between the separators 32, 34 may vary according to other exemplary embodiments).

In this manner, a layered structure is formed in which the positive and negative electrodes 36, 38 are separated from each other by separators 32, 34 (and may be offset from each other in the manner described with respect to FIG. 5). Additionally, the leading edge of the positive electrode 36 is offset from the leading edge of the negative electrode 38 by a distance known as a negative electrode overlap. In the exemplary embodiment shown, the negative electrode overlap of the leading edges is 40 millimeters (although this may vary according to other exemplary embodiments).

The separators 32, 34 and electrodes 36, 38 are then wound around the mandrel 50 to form the wound cell element 30 by inserting a driver (not shown) into a drive member 60 of the mandrel 50 and rotating the driver to turn the mandrel 50. According to an exemplary embodiment, the driver may extend entirely through the drive member 60 or may extend only partially into the drive member 60. According to another exemplary embodiment, the driver may extend entirely through mandrel 50 and engage both of the drive members 60. In this case, both of the drive members 60 should be aligned with one another in order to properly receive the driver.

According to an exemplary embodiment, two drivers (not shown) may be used to drive the mandrel 50 (e.g., one at either end of the mandrel 50 such that each driver is inserted into its own drive member 60). According to another exemplary embodiment, only a single driver (not shown) may be used to drive or rotate the mandrel 50. In this embodiment, the single driver is inserted into a first drive member 60 of the mandrel 50 with the opposite end of the mandrel 50 being received or engaged by a freely rotating spindle. In this case, the non-driven end of the mandrel 50 (i.e., the end not receiving the driver) may or may not have a second drive member 60 as discussed above in relation to FIGS. 8-9.

FIG. 11 illustrates a cell element 30 as it appears near the end of the winding operation (the mandrel 50 is shown as the center of the wound cell element 30, about which the electrodes 36, 38 and separators 32, 34 are wound). The trailing edge of the positive electrode 36 is offset from the trailing edge of the negative electrode 38 by a predetermined distance (e.g., according to an exemplary embodiment, the distance is 20 millimeters, although this may vary according to other exemplary embodiments). The separators 32, 34 are then wound a further two turns to ensure that there is no contact between the positive and negative electrodes 36, 38. Although the exemplary embodiment shown in FIGS. 10-11 describes specific values for the various overlaps and number of turns of separator used, it should be noted that these values may vary according to other exemplary embodiments.

Figure 12:
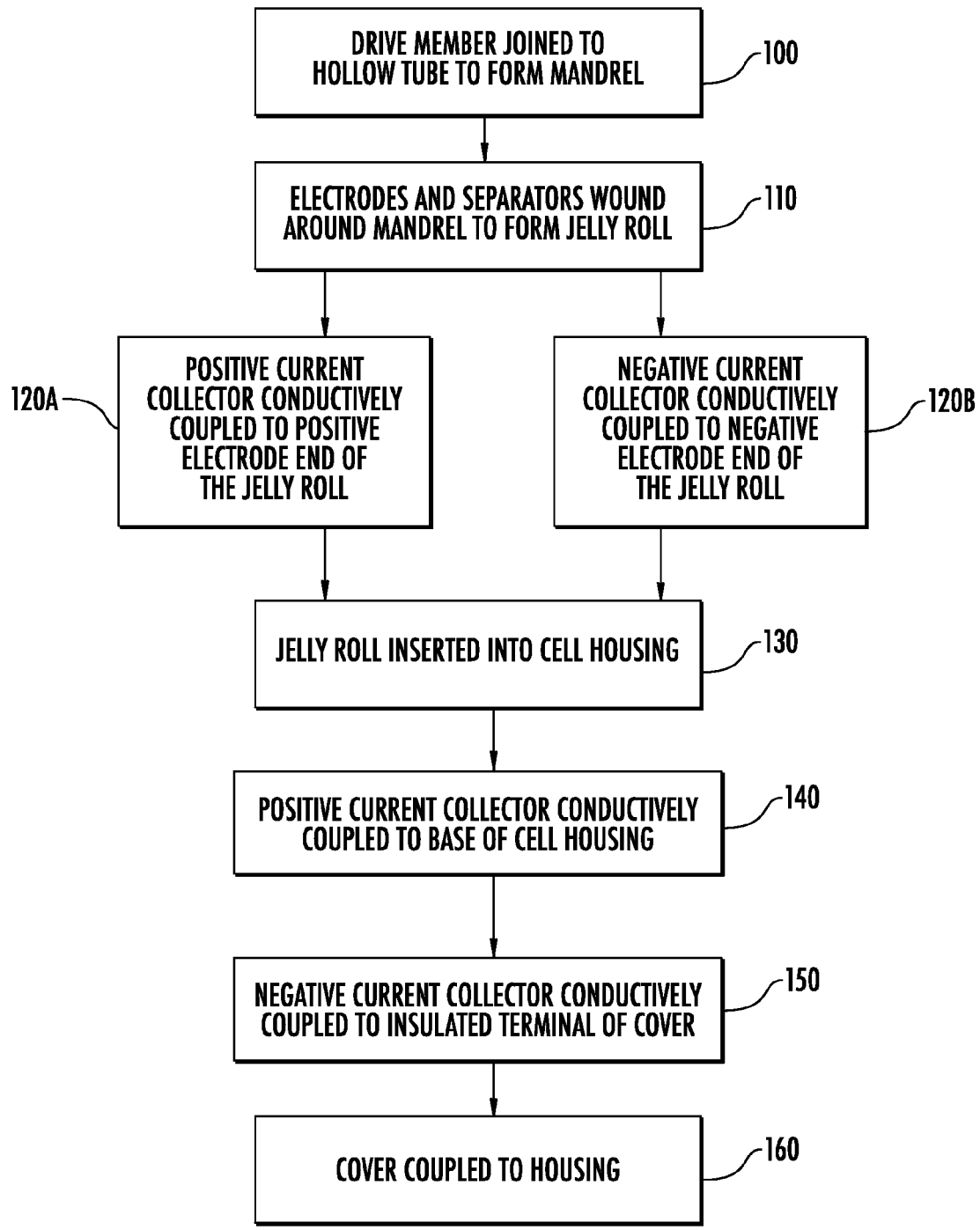
FIG. 12 is a flow diagram for a method of manufacturing an electrochemical cell according to an exemplary embodiment.

Referring now to FIG. 12, a flowchart describes an assembly or manufacturing process for an electrochemical cell according to an exemplary embodiment. In a first step 100, one or more drive members are joined to a hollow tube to form a mandrel in a manner such as that described herein (e.g., with a press fit, overmold, adhesive, etc.). In a second step 110, the separators and electrodes are wound around the mandrel to form the cell element (e.g., using the method described previously by attaching the separators to the mandrel, inserting the electrodes between the separators, and rotating the mandrel after inserting a driver into the drive member(s) and rotating the driver and the mandrel). In a third step 120A/B, positive and negative current collectors are conductively coupled (e.g., by a welding operation) to positive and negative electrodes, respectively, of the cell element.

In a fourth step 130, the cell element is inserted into a cell housing or can. In a fifth step 140, the positive current collector is conductively coupled (e.g., by a welding operation) to the base of the cell housing. In a sixth step 150, the negative current collector is conductively coupled (e.g., by a welding operation) to a terminal that is insulated from the cover of the cell housing. In a seventh step 160, the cover is conductively coupled (e.g., by a welding operation) to the cell housing. An electrolyte may be introduced into the housing at any suitable point (e.g., after the mechanical assembly of the cell is completed and/or the cover has been coupled to the housing).

According to an exemplary embodiment, a mandrel for an electrochemical cell or battery (e.g., for use in a vehicle) includes a hollow tube (e.g., a metal tube) having one or more members or elements (e.g., drive members, caps, end members, etc.) coupled thereto. Each drive member is inserted at least partially into the tube and joined thereto by press-fitting, overmolding, with adhesives, or with other suitable means. The hollow tube is made of aluminum or other suitable material (e.g., other conductive metals or metal alloys) and the drive member is made of a chemically resistant plastic resin or other suitable material (e.g., other suitable polymeric materials). One or more members or elements (e.g., elongated members or elements provided in the form of a driver) may be inserted into the drive member such that the driver engages features in the interior of the drive member to rotate the drive member so as to form a wound cell element for the electrochemical cell (e.g., the drive member may have internal protrusions that engage the driver such that when the driver is rotated, the drive member also rotates, which can be used to wind electrodes and separators around the mandrel assembly).

According to another exemplary embodiment, a mandrel for a vehicle battery or cell includes a hollow tube having two drive members coupled to opposite ends thereof. The drive members are joined to the hollow tube by press-fitting, overmolding, or adhesives. The hollow tube is made of aluminum or other suitable material (e.g., other conductive metals or metal alloys) and the insulating drive member is made of a chemically resistant plastic resin or other suitable material (e.g., other suitable polymeric materials).

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure. It is important to note that the construction and arrangement of the mandrel as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A mandrel for an electrochemical cell having a wound cell element with an electrode, the mandrel comprising:
   an elongated hollow tube;
   an electrode wound around the hollow tube; and
   at least one drive member provided at an end of the hollow tube and configured to receive a driver in order to rotate the mandrel, the drive member electrically insulating the hollow tube from the electrode.

2. The mandrel of claim 1, further comprising a second drive member provided at a second end of the hollow tube.

3. The mandrel of claim 2, wherein the first and second drive members are configured to receive a driver that extends through the hollow tube to engage both the first and second drive members in order to rotate the mandrel.

4. The mandrel of claim 1, wherein the at least one drive member comprises at least one projection provided on an external surface thereof configured to engage an internal surface of the hollow tube when coupled to the hollow tube.

5. The mandrel of claim 1, wherein the at least one drive member comprises at least one projection on an internal surface thereof configured to be engaged by a driver in order to rotate the mandrel.

6. The mandrel of claim 1, wherein the at least one drive member is constructed from a material that is different than a material used to form the hollow tube.

7. The mandrel of claim 1, wherein the drive member is a polymeric material and the hollow tube is constructed from a metallic material.

8. The mandrel of claim 1, wherein:
   the drive member is complementary in geometry to the driver so as to be engageable by the driver for rotating the mandrel; and
   the drive member and the hollow tube are complementary in geometry and material to each other and to the electrode wound around the hollow tube, such that the drive member electrically insulates the hollow tube from the electrode.

9. The mandrel of claim 1, wherein the hollow tube and drive member have outer diameters approximately equal to each other.

10. The mandrel of claim 1, wherein the mandrel and drive member have a cooperative length relative to the electrode such that the drive member does not extend to at least one end of the electrode.

11. The mandrel of claim 4, wherein the drive member and the projection are complementary in geometry to each other and to the internal surface of the hollow tube such that the projection is press fit into engagement with the internal surface of the hollow tube.

12. The mandrel of claim 2, wherein:
   the second drive member is complementary in geometry to the driver so as to be engageable by the drive for rotating the mandrel; and
   the second drive member and the hollow tube have complementary geometry and material such that the second drive member may electrically insulate the hollow tube from the electrode.

13. The mandrel of claim 12, wherein the first drive member and the second drive member are configured to electrically insulate the electrode from the hollow tube without regard to orientation of the mandrel.

* * * * *